(12) United States Patent
Barker et al.

(10) Patent No.: US 6,542,075 B2
(45) Date of Patent: Apr. 1, 2003

(54) SYSTEM AND METHOD FOR PROVIDING CONFIGURABLE SECURITY MONITORING UTILIZING AN INTEGRATED INFORMATION PORTAL

(75) Inventors: Geoffrey T. Barker, Bainbridge Island, WA (US); Bruce Alexander, Poulsbo, WA (US); Paul Talley, Redmond, WA (US)

(73) Assignee: Vigilos, Inc., Seattle, WA (US)

( * ) Notice: Subject to any disclaimer, the term of this patent is extended or adjusted under 35 U.S.C. 154(b) by 0 days.

(21) Appl. No.: 09/761,339

(22) Filed: Jan. 16, 2001

(65) Prior Publication Data

US 2002/0095490 A1 Jul. 18, 2002

Related U.S. Application Data

(60) Provisional application No. 60/236,282, filed on Sep. 28, 2000.

(51) Int. Cl.[7] .................. G08B 29/00; G05B 15/00; G06F 9/46
(52) U.S. Cl. .................. 340/506; 340/3.1; 340/511; 700/17; 700/83; 709/318
(58) Field of Search .................. 340/506, 539, 340/531, 3.1, 511; 700/17, 83; 709/238, 318, 203, 217

(56) References Cited

U.S. PATENT DOCUMENTS

| | | |
|---|---|---|
| 4,216,375 A | 8/1980 | Ulch et al. |
| 4,218,690 A | 8/1980 | Ulch et al. |
| 4,581,634 A | 4/1986 | Williams |
| 4,714,995 A | 12/1987 | Materna et al. |
| 4,721,954 A | 1/1988 | Mauch |
| 4,816,658 A | 3/1989 | Khandwala et al. |
| 4,837,568 A | 6/1989 | Snaper |
| 4,839,640 A | 6/1989 | Ozer et al. |

(List continued on next page.)

FOREIGN PATENT DOCUMENTS

| | | |
|---|---|---|
| EP | 0804031 | 10/1997 |
| WO | WO 97/07486 | 2/1997 |
| WO | WO 01/28251 | 4/2001 |

OTHER PUBLICATIONS

EyeCast.com Introduces SchoolCast services for School Safety Officials and Law Enforcement Agencies, Press Release dated Apr. 28, 1999.
EyeCast.com Adds 360–degree Continuous Pan Rotation Cameras to It's[sic] EyeView Service, Press Release dated Mar. 15, 1999.
Screen Printing from www.remotecams.com, "Take a Step Into the Future . . . ," printed Sep. 17, 1999.
EyeCast.com, "EyeCast secures deals . . . ," *Washington Business Journal*, Aug. 13–19, 1999, Tech Section, p. 16.
EyeCast.com Announces EyeView Control, Press Release dated Oct. 12, 1998.

(List continued on next page.)

*Primary Examiner*—Donnie L. Crosland
(74) *Attorney, Agent, or Firm*—Christensen O'Connor Johnson Kindness PLLC

(57) ABSTRACT

A system and method for implementing a configurable security monitor utilizing an integrated information portal are provided. A premises server is in communication with a variety of information sources that produce monitoring data for a defined monitoring target, such as a premises. The premises server transmits the monitoring data to a central server that receives the data and traverses one or more logical rule sets to determine whether the inputted data violates the rules. The rules are generally specified by a user, such as a system administrator to define the level of monitoring desired and an appropriate response in the evaluation of the monitoring data against the rule. Based on an evaluation of the rules, the central server then generates outputs in the form of communication to one or more authorized users via a variety of communication mediums and devices and/or the

43 Claims, 8 Drawing Sheets

U.S. PATENT DOCUMENTS

| | | | |
|---|---|---|---|
| 4,962,473 A | | 10/1990 | Crain |
| 4,998,279 A | | 3/1991 | Weiss |
| 5,097,505 A | | 3/1992 | Weiss |
| 5,204,670 A | * | 4/1993 | Stinton .................. 340/825.49 |
| 5,210,873 A | | 5/1993 | Gay et al. |
| 5,475,375 A | | 12/1995 | Barrett et al. |
| 5,475,378 A | | 12/1995 | Kaarsoo et al. |
| 5,544,062 A | | 8/1996 | Johnston, Jr. |
| RE35,336 E | | 9/1996 | Ulch et al. |
| 5,614,890 A | | 3/1997 | Fox |
| 5,629,981 A | | 5/1997 | Nerlikar |
| 5,654,696 A | | 8/1997 | Barrett et al. |
| 5,680,328 A | | 10/1997 | Skorupski et al. |
| 5,682,142 A | | 10/1997 | Loosmore et al. |
| 5,768,119 A | | 6/1998 | Havekost et al. |
| 5,810,747 A | * | 9/1998 | Brudny et al. .............. 600/595 |
| 5,870,733 A | | 2/1999 | Bass et al. |
| 5,903,455 A | | 5/1999 | Sharpe, Jr. et al. |
| 5,917,405 A | * | 6/1999 | Joao ........................ 340/425.5 |
| 5,923,264 A | | 7/1999 | Lavelle et al. |
| 5,960,174 A | | 9/1999 | Dew |
| 5,987,519 A | * | 11/1999 | Peifer et al. ................. 709/230 |
| 6,023,223 A | | 2/2000 | Baxter, Jr. |
| 6,031,455 A | | 2/2000 | Grube et al. |
| 6,064,723 A | | 5/2000 | Cohn et al. |
| 6,233,588 B1 | | 5/2001 | Marchoili et al. |
| 6,356,949 B1 | | 3/2002 | Katsandres et al. |

OTHER PUBLICATIONS

EyeCast Announces EyeCapture Services, Press Release dated Jul. 8, 1998.

EyeCast.com, Inc., "Providing Live Interactive Video for Surveillance & Monitoring Over the Internet", Apr. 2002.

Axis Communications, publication entitled "Axis 200+ Web Camera", Apr. 2002.

Axis Communications, publication entitled "Axis 240 Camera Server", Apr. 2002.

Axis Communications, www.axis.se/products/cam_240/, "30 Frames/Second", printed Sep. 28, 1999.

Axis Communications, www.axis.se/products/camera_servers/cam_app_sol.htm, "Network Cameras Applications and Solutions", printed Sep. 28, 1999.

Axis Communications, www.axis.se/products/camera_servers/cam_fb.html, "Features and Benefits", printed Sep. 24, 1999.

* cited by examiner

SYSTEM AND METHOD FOR PROVIDING CONFIGURABLE SECURITY MONITORING UTILIZING AN INTEGRATED INFORMATION PORTAL

RELATIONSHIP TO OTHER APPLICATIONS

This application claims the benefit of U.S. Provisional Application No. 60/236,282 filed Sep. 28, 2000. Provisional Application No. 60/236,282 is specifically incorporated herein by reference.

FIELD OF THE INVENTION

The present invention relates generally to a security monitoring network and, in particular, to a system and method for providing variable, remote monitoring of a locally detected event utilizing an integrated information portal.

BACKGROUND OF THE INVENTION

Generally described, electronic security systems are configured to provide a wide range of security services in both residential and commercial settings. The types of monitoring devices utilized by a particular security system to perform the system service depend greatly on the sophistication of the security system configuration and the overall function of the security system. A majority of conventional security systems include intrusion detecting devices, such as door or window contacts, glass break detectors, motion detectors and the like. In a commercial setting, closed-circuit television (CCTV), badging systems, asset tracking, and access control devices and sensors are also utilized.

The configuration of the security system is based on the function the system will serve. For example, in one aspect, a typical electronic security system may be utilized to provide smoke, fire, and/or carbon monoxide detection. Accordingly, the system would utilize one or more smoke, fire and/or carbon monoxide detectors within one or more locations on the premises. In another aspect, the security system may also be utilized to provide motion or access detection as well as general video and audio monitoring of the premises. Accordingly, the system would utilize ingress or egress sensors and/or video cameras within the premises.

While the conventional art generally discloses utilizing multiple monitoring devices to perform various functions, conventional systems are deficient in having a lack of data management functionality and integration. Security data from different monitoring device types is generally not integrated to affect the system reporting and control. Instead, the conventional security system is built around independent stand alone devices that require human control and interpretation.

In one security configuration, contract or in-house security guard and patrol services are employed in a range of industrial commercial, public and private settings. The primary functions of the security guard may include direct visual surveillance, the monitoring of security cameras or other security devices, a reception or access control and authorization function, and incident response. A security guard may also serve as a monitor of close circuit television ("CCTV"), arranged as a number of televisions in a bank formation. Accordingly, the security guard accepts the variety of inputs and makes a determination of a security alert, such as an unauthorized entrance.

Use of dedicated monitoring services, such as a security guard, however, is prohibitively expensive and unavailable for a majority of individual homeowners or small business users. Additionally, if the guard is distracted, absent or inattentive, a security event may go unreported. Furthermore, the monitoring device data, such as the CCTV data, is typically available only to the dedicated premises monitor and cannot be utilized concurrently by additional users, such as a remote monitor, a quality control supervisor, the owner of the premises, or emergency or public safety authorities. Moreover, a single security guard may not be capable of processing all of the possible monitoring data sources simultaneously, thereby reducing the effectiveness of multiple monitoring devices.

Another security system configuration utilizes external monitors to provide the security services. Generally described, external monitoring systems are more cost effective than a dedicated on-premises monitor. However, most external monitoring systems have a limited effectiveness in being unable to extensively provide and/or review detailed security information. For example, most conventional external monitoring systems cannot incur the expense of providing a sufficient amount of communication bandwidth to transmit continuous video/audio feeds from every monitored premises. Accordingly, if the external monitoring service detects an unauthorized entry into a premises, such as through a signal from a detecting device, the monitoring service typically dispatches emergency or public safety authorities to investigate and determine the extent of the detected event. In a vast majority of cases, the alarm is false and the premises owner incurs a fine for having the authorities verify the incident. Additionally, in the event of an actual emergency, the monitoring service cannot provide the public safety authorities with sufficient information to assess the situation with monitoring devices, thereby putting the authorities at greater risk.

Similar to the dedicated on-premises monitoring, the remote monitoring service also cannot concurrently process the device information to multiple authorized users for various purposes. For example, a premises owner may need to access video data to locate a pet within the premises, while emergency or public safety personnel would need to access the same video data to identify the location of a victim. In both cases, the monitoring service likely cannot provide the information to the user on a wide scale basis.

Some conventional security system configurations attempt to integrate at least some security monitoring devices to better detect alarm conditions from a remote user. For example, a security system monitor (either remote or on-premises) may detect an unauthorized entry from a motion detector and confirm it by utilizing a video camera. Generally however, these systems are directed towards a combination of video surveillance and are limited into being processed solely for the detection of an intrusion or the verification of an intrusion. These systems generally cannot accept additional non-security information inputs that relate generally to the management of the premises and that are outside of the scope of conventional security-type monitoring. Moreover, these systems are deficient in that the data cannot be processed concurrently or distributed to multiple authorized users.

In addition to the above-mentioned deficiencies in the conventional art, some monitoring systems, either with a on-premises guard or an external monitor, further are deficient in creating an uncomfortable environment by monitoring (and often recording) on a continuous basis. For example, it may be advantageous to have video access to a public restroom in the event of a medical emergency. However, one skilled in the relevant art will appreciate that the constant monitoring of a public restroom creates an uncomfortable environment for patrons utilizing the facilities during non-emergencies. Additionally, continuous monitoring of areas not prone to have a high rate of emergencies quickly becomes expensive. For example, the constant monitoring of a parking lot during typically off-peak hours presents a great expense to a parking lot provider. Accordingly, many parking lots are left to be monitored by attendants that may have a variety of functions, such as collection, access control, etc.

Thus, there is a need a security monitoring system that can provide flexible levels of information monitoring.

SUMMARY OF THE INVENTION

A system and method for implementing a configurable security monitor utilizing an integrated information portal are provided. A premises server is in communication with a variety of information sources that produce monitoring data for a defined monitoring target, such as a premises. The premises server transmits the monitoring data to a central server that receives the data and traverses one or more logical rule sets to determine whether the inputted data violates the rules. The rules are generally specified by a user, such as a system administrator to define the level of monitoring desired and an appropriate response in the evaluation of the monitoring data against the rule. Based on an evaluation of the rules, the central server then generates outputs in the form of communication to one or more authorized users via a variety of communication mediums and devices and/or the instigation of a variety of acts.

In accordance with an aspect of the present invention, a method for monitoring information in an integrated information portal in communication with a number of monitoring devices is provided. The integrated information portal obtains a set of user defined monitoring rules. The user defined monitoring rules establish an event threshold for a rule violation and a corresponding response. The integrated information portal obtains monitoring device data from one or more of the monitoring devices and processes the monitoring device data according to the user defined monitoring rules. The integrated information portal generates an output corresponding to the user defined monitoring rules, wherein the output may include no output.

In accordance with another aspect of the present invention, a system for monitoring information is provided. The system includes a number of monitoring devices operable to capture and transmit monitoring device data, a central processing server operable to obtain monitoring device data and process the data, and a rule event database in communication with the central processing server. The rules database includes user defined rules allow the central processing server to generate customized outputs corresponding to a processing of the monitoring device data with the one or more user defined rules.

In accordance with a further aspect of the present invention, a method for providing security monitoring in an integrated information portal in communication with a number of monitoring devices is provided. The integrated information portal obtains a request for monitoring of a remote site. The integrated information portal obtains monitoring device data corresponding to the request for monitoring. The integrated information portal then processes the monitoring device data according to a set of user-defined rules.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
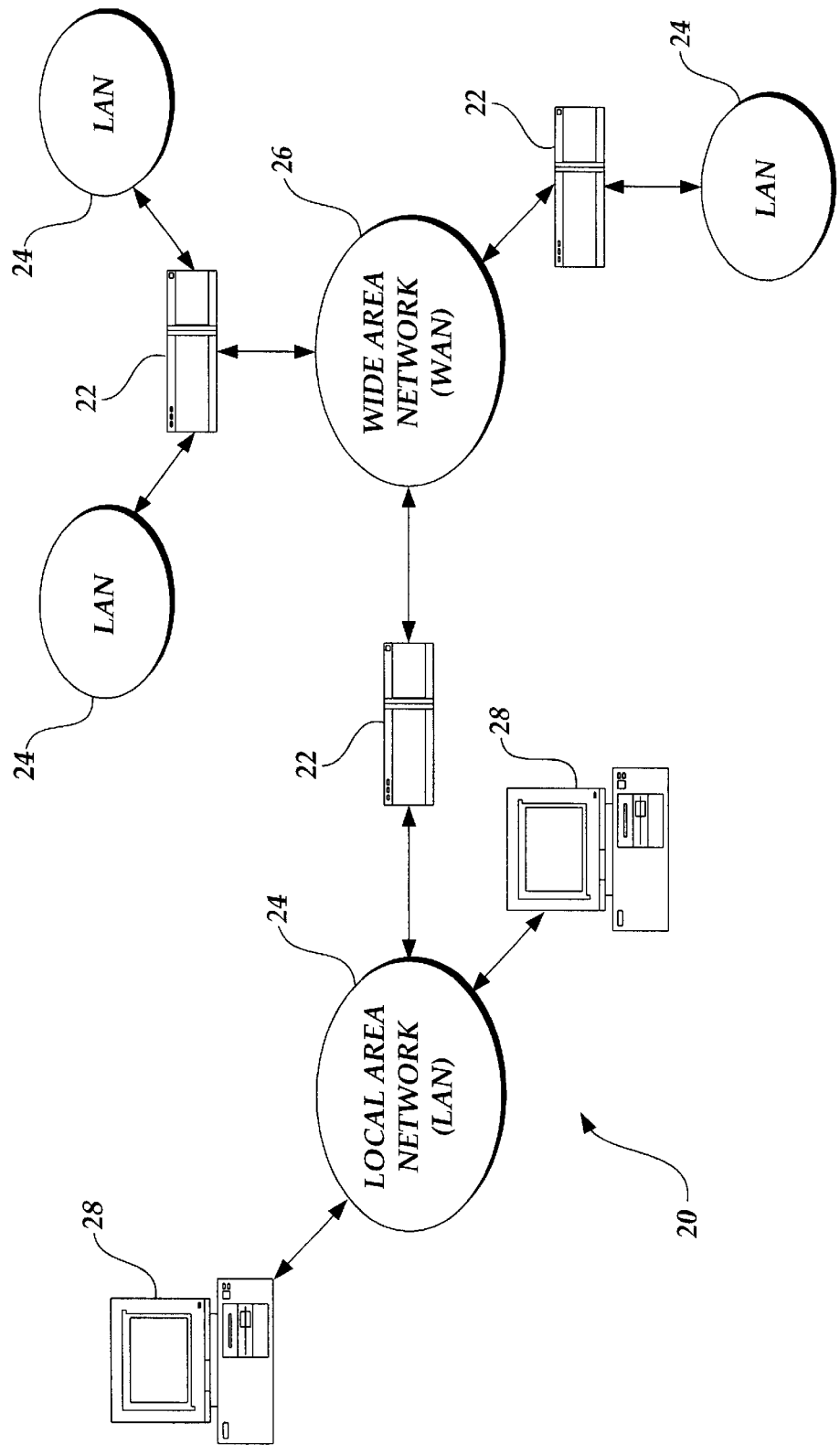
FIG. 1 is a block diagram of an Internet environment.

As described above, aspects of the present invention are embodied in a World Wide Web (the "WWW" or "web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1. One skilled in the relevant art will appreciate that aspects of the present invention may be practiced on Internet networks, such as an Intranet.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
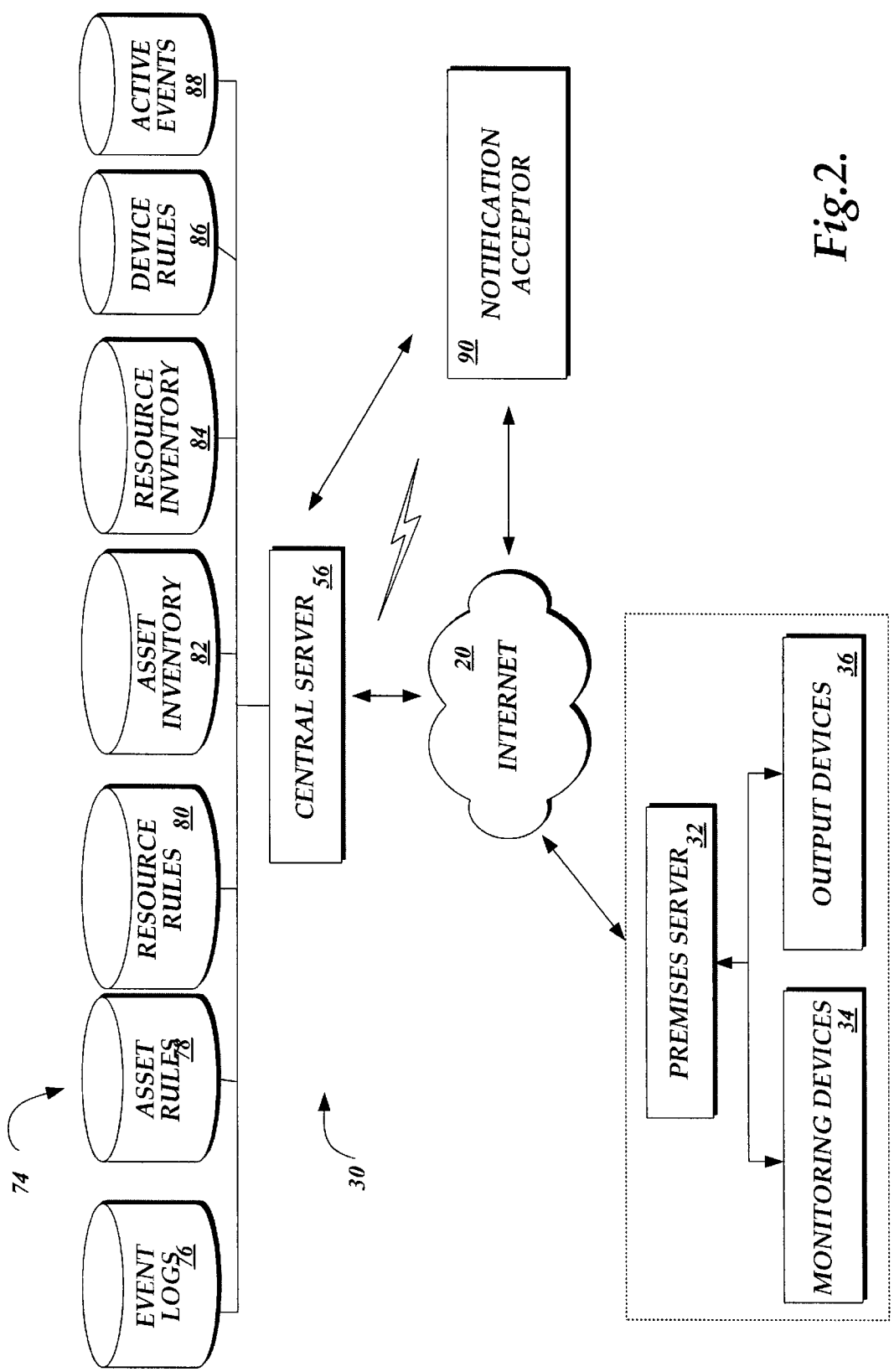
FIG. 2 is a block diagram of an integrated information portal in accordance with the present invention.

Referring now to FIG. 2, an actual embodiment of an integrated information system 30 in accordance with the present invention will be described. An integrated information system 30 is a subscriber-based system allowing a number of monitoring devices within one or more premises to be processed at a single control location. Additionally, the data from the monitoring devices is processed according to one or more rules. The control location customizes output of the processed data to a number of authorized users dependent on the preferences and rights of the user. While the system of the present invention is utilized to integrate traditional security monitoring functions, it is also utilized to integrate any information input in a like manner.

With reference to FIG. 2, the information system 30 includes a premises server 32 located on a premises. The premises server 32 communicates with one or more monitoring devices 34. In an illustrative embodiment, the monitoring devices 34 can include smoke, fire and carbon monoxide detectors. The monitoring devices 34 can also include door and window access detectors, glass break detectors, motion detectors, audio detectors and/or infrared detectors. Still further, the monitoring devices 34 can include computer network monitors, voice identification devices, video cameras, still cameras, microphones and/or fingerprint, facial, retinal, or other biometric identification devices. Still further, the monitoring devices 34 can include conventional panic buttons, global positioning satellite (GPS) locators, other geographic locators, medical indicators, and vehicle information systems. The monitoring devices 34 can also be integrated with other existing information systems, such as inventory control systems, accounting systems, or the like. It will be apparent to one skilled in the relevant art that additional or alternative monitoring devices 34 may be practiced with the present invention.

The premises server 32 also communicates with one or more output devices 36. In an illustrative embodiment, the output devices 36 can include audio speakers, display or other audio/visual displays. The output devices 36 may also include electrical or electro-mechanical devices that allow the system to perform actions. The output devices 36 can include computer system interfaces, telephone interfaces, wireless interfaces, door and window locking mechanisms, aerosol sprayers, and the like. As will be readily understood by one skilled in the art, the type of output device is associated primarily with the type of action the information system 30 produces. Accordingly, additional or alternative output devices 36 are considered to be within the scope of the present invention.

Figure 3:
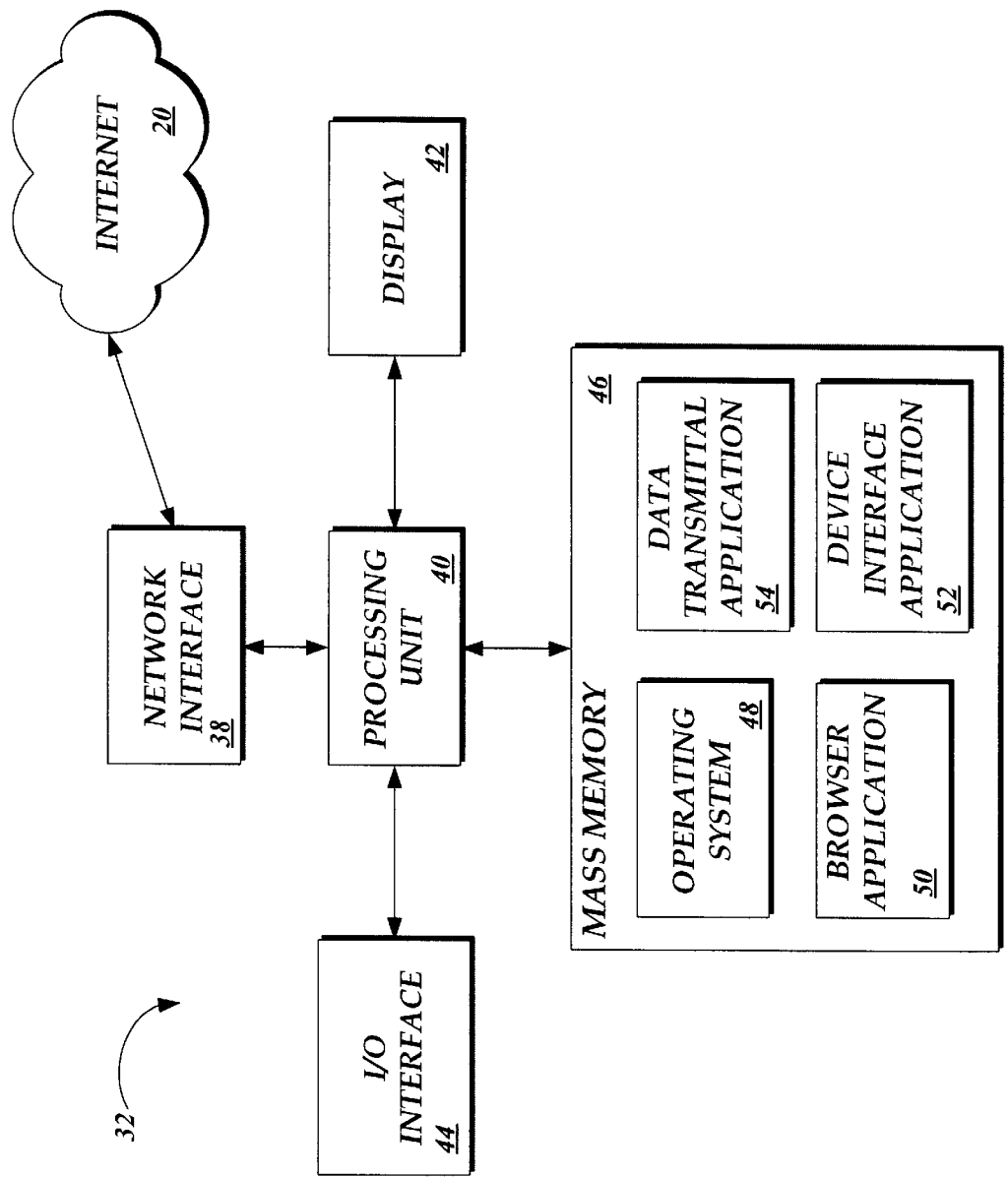
FIG. 3 is a block diagram depicting an illustrative architecture for a premises server in accordance with the present invention.

FIG. 3 is a block diagram depicting an illustrative architecture for a premises server 32. Those of ordinary skill in the art will appreciate that the premises server 32 includes many more components then those shown in FIG. 3. However, it is not necessary that all of these generally conventional components be shown in order to disclose an illustrative embodiment for practicing the present invention. As shown in FIG. 3, the premises server 32 includes a network interface 38 for connecting directly to a LAN or a WAN, or for connecting remotely to a LAN or WAN. Those of ordinary skill in the art will appreciate that the network interface 38 includes the necessary circuitry for such a connection, and is also constructed for use with the TCP/IP protocol, the particular network configuration of the LAN or WAN it is connecting to, and a particular type of coupling medium. The premises server 32 may also be equipped with a modem for connecting to the Internet through a point to point protocol ("PPP") connection or a SLIP connection as known to those skilled in the art.

The premises server 32 also includes a processing unit 40, a display 42, an input/output (I/O) interface 44 and a mass memory 46, all connected via a communication bus, or other communication device. The I/O interface 44 includes hardware and software components that facilitates interaction with a variety of the monitoring devices via a variety of communication protocols including TCP/IP, X10, digital I/O, RS-232, RS-485 and the like. Additionally, the I/O interface 44 facilitates communication via a variety of communication mediums including telephone land lines, wireless networks (including cellular, digital and radio networks), cable networks and the like. In an actual embodiment of the present invention, the I/O interface is implemented as a layer between the server hardware and software applications utilized to control the individual monitoring devices. It will be understood by one skilled in the relevant art that alternative interface configurations may be practiced with the present invention.

The mass memory 46 generally comprises a RAM, ROM, and a permanent mass storage device, such as a hard disk drive, tape drive, optical drive, floppy disk drive, or combination thereof. The mass memory 46 stores an operating system 48 for controlling the operation of the premises server. It will appreciated that this component may comprises a general-purpose server operating system as is known to those skilled in the art, such as UNIX, LINUX™, or Microsoft WINDOWS NT®. The memory also includes a WWW browser 50, such as Netscape's NAVIGATOR® or Microsoft's Internet Explorer browsers, for accessing the WWW.

The mass memory 46 also stores program code and data for interfacing with various premises monitoring devices, for processing the monitoring device data and for transmitting the data to a central server. More specifically, the mass memory stores a device interface application 52 in accordance with the present invention for obtaining monitoring device data from a variety of devices and for manipulating the data for processing by the central server. The device interface application 52 comprises computer-executable instructions which, when executed by the premises server 32 obtains and transmits device data as will be explained below in greater detail. The mass memory 46 also stores a data transmittal application program 54 for transmitting the device data to a central server and to facilitate communication between the central server and the monitoring devices 34. The operation of the data transmittal application 54 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 4:
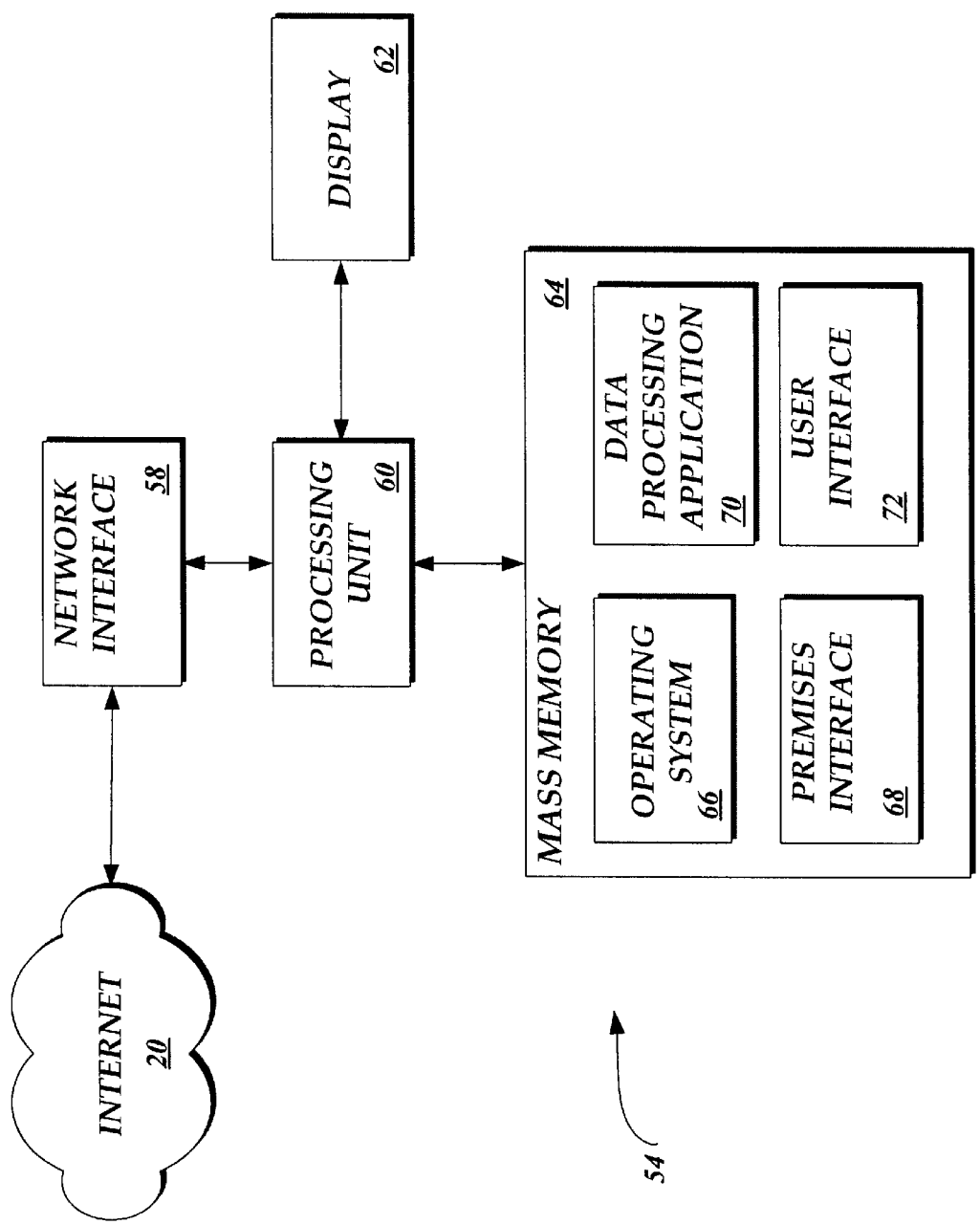
FIG. 4 is a block diagram depicting an illustrative architecture for a central server in accordance with the present invention.

Returning to FIG. 2, the premises server 32 is in communication with a central server 56. Generally described, the central server 56 obtains various monitoring device data, processes the data and outputs the data to one or more authorized users. In an illustrative embodiment, the communication between the central server 56 and the premises server 32 is remote and two-way. FIG. 4 is a block diagram depicting an illustrative architecture for a central server 56. Those of ordinary skill in the art will appreciate that the central server 56 includes many more components then those shown in FIG. 4. However, it is not necessary that all of these generally conventional components be shown in order to disclose an illustrative embodiment for practicing the present invention.

As shown in FIG. 4, the central server 56 includes a network interface 58 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 56 may also be equipped with a modem for connecting to the Internet 20 through a point to point protocol ("PPP") connection or a SLIP connection as known to those skilled in the art.

The central server 56 also includes a processing unit 60, a display 62 and a mass memory 64, all connected via a communication bus, or other communication device. The mass memory 64 generally comprises a RAM, ROM, and a permanent mass storage device, such as a hard disk drive, tape drive, optical drive, floppy disk drive, or combination thereof. The mass memory 64 stores an operating system 66 for controlling the operation of the central server. It will appreciated that this component may comprises a general-purpose server operating system as is known to those skilled in the art, such as UNIX, LINUX™, or Microsoft WINDOWS NT®.

The mass memory 64 also stores program code and data for interfacing with the premises devices, for processing the device data and for interfacing with various authorized users. More specifically, the mass memory 64 stores a premises interface application 68 in accordance with the present invention for obtaining data from a variety of monitoring devices and for communicating with the premises server. The premises interface application 68 comprises computer-executable instructions which, when executed by the central server 56, interfaces with the premises server 32 as will be explained below in greater detail. The mass memory 64 also stores a data processing application 70 for processing monitoring device data in accordance with rules maintained within the central server. The operation of the data processing application 70 will be described in greater detail below. The mass memory 64 further stores an authorized user interface application 72 for outputting the processed monitoring device data to a variety of authorized users in accordance with the security process of the present invention. The operation of the authorized user interface application 72 will be described in greater detail below. It will be appreciated that these components may be stored on a computer-readable medium and loaded into the memory of the central server using a drive mechanism associated with the computer-readable medium, such as a floppy, CD-ROM, DVD-ROM drive, or network drive.

It will be understood by one skilled in the relevant art that the premises server 32 may be remote from the premises or may omitted altogether. In such an alternative embodiment, the monitoring devices 34 transmit the monitoring data to a remote premises server 32 or alternatively, they transmit the monitoring data directly to the central server 56.

Also in communication with the central server 56 is a central database 74. In an illustrative embodiment, the central database 74 includes a variety of databases including an event logs database 76, an asset rules database 78, a resource rules database 80, an asset inventory database 82, a resource inventory database 84, an event rules database 86 and an active events database 88. The utilization of the individual databases within the central database 74 will be explained in greater detail below. As will be readily understood by one skilled in the relevant art, the central database 74 may be one or more databases, which may be remote from one another. Additionally, it will be further understood that one or more of the databases 74 may be maintained outside of the central server 56.

With continued reference to FIG. 2, the central server 56 communicates with one or more notification acceptors 90. In an illustrative embodiment, the notification acceptors 90 include one or more authorized users. Each authorized user has a preference of notification means and rights to the raw and processed monitoring data. The authorized users include premises owners, security directors or administrators, on-site security guards, technicians, remote monitors (including certified and non-certified monitors), customer service representatives, emergency personnel and others. As will be readily understood by one skilled in the art, various user authorizations may be practiced with the present invention.

In an illustrative embodiment of the present invention, the central server 56 communicates with the notification acceptors 90 utilizing various communication devices and communication mediums. The devices include personal computers, hand-held computing devices, wireless application protocol enabled wireless devices, cellular or digital telephones, digital pagers, and the like. Moreover, the central server 56 may communicate with these devices via the Internet 20 utilizing electronic messaging or Web access, via wireless transmissions utilizing the wireless application protocol, short message services, audio transmission, and the like. As will be readily understood by one skilled in the art, the specific implementation of the communication mediums may require additional or alternative components to be practiced. All are considered to be within the scope of practicing the present invention.

Generally described, the present invention facilitates the collection and processing of a variety of premises information for distribution to one or more authorized users. The system of the present invention obtains monitoring data from any one of a variety of monitoring devices 34. In actual embodiment of the present invention, the monitoring device data is processed according to one or more user/monitor defined rules to detect a specified event. Specified events can include security events or confirmation of activities.

In an actual embodiment of the present invention, the monitoring device data is categorized as asset data, resource data or device data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

The monitoring device data is obtained by the monitoring devices 34 on the premises server 32 and transmitted to the central server 56. The central server 56 receives the monitoring device data and processes the data according to a rules-based decision support logic. In an actual embodiment of the present invention, the central server 56 maintains databases 74 having logic rules for asset data, resource data and event data. Moreover, because the monitoring device data is potentially applicable to more than one authorized user, multiple rules may be applied to the same monitoring device data. In an alternative embodiment, the rules databases 74 may be maintained in locations remote from the central server 56.

In the event the processing of the monitoring device rules indicates that action is required, the central server 56 generates one or more outputs associated with the rules. The outputs include communication with indicated notification acceptors 90 according to the monitoring device data rules. For example, an authorized user may indicate a hierarchy of communication mediums (such as pager, mobile telephone, land-line telephone) that should be utilized in attempting to contact the user. The rules may also indicate contingency contacts in the event the authorized user cannot be contacted. Additionally, the rules may limit the type and/or amount of data the user is allowed to access. Furthermore, the outputs can include the initiation of actions by the central server 56 in response to the processing of the rules.

Figure 5:
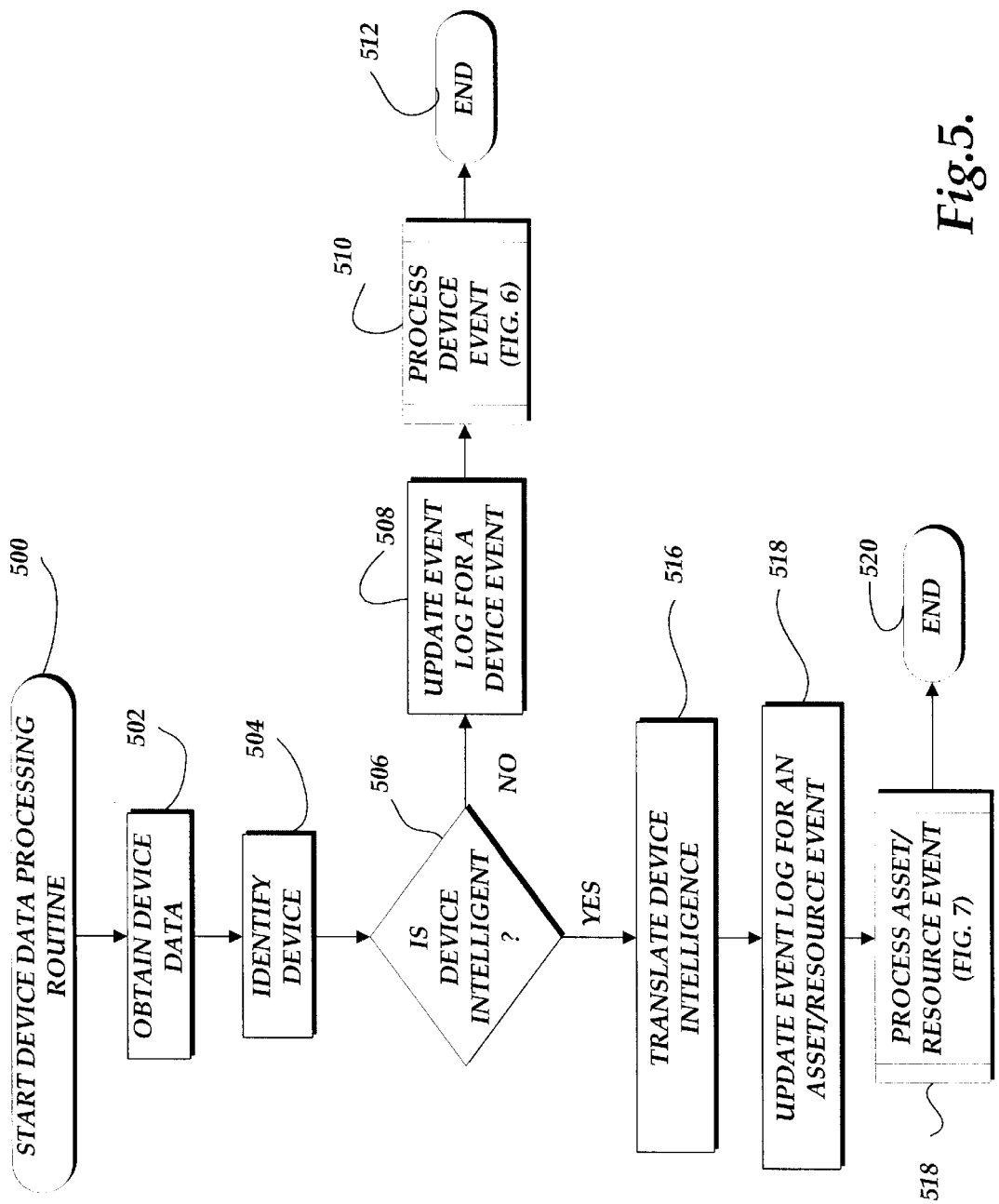
FIG. 5 is a flow diagram illustrative of a monitoring device data processing routine in accordance with the present invention.

FIG. 5 is a flow diagram illustrative of a device decision support process support routine 500 for processing the monitoring device data in accordance with the present invention. At block 502, the central server 56 obtains an input from a monitoring device. In an actual embodiment of the present invention, the input is obtained from the premises server 32. Alternatively, the input may be received directly from the monitoring device 34 or the central server 56 may poll individual devices (or the premises server 32) for an input. At block 504, the central server 56 identifies the device processing the data. The identification may be accomplished by determining a network address from which the input originated and which is assigned to the specific devices, or by reading other identification data that can be included with the data input.

At decision block 506, a test is performed to determine whether the device data includes intelligence data. In an actual embodiment of the present invention, intelligent data is characterized as asset data or resource data, because the data contains information identifying the object. On the other hand, data that does not contain any information identifying an object is not considered intelligent. If the device is not determined to be intelligent or if the device cannot identified, at block 508, an event log database 76 is updated to reflect the input data. At block 510, the central server 56 processes the data according to a process device event subroutine. The routine 500 terminates at block 512.

Figure 6:
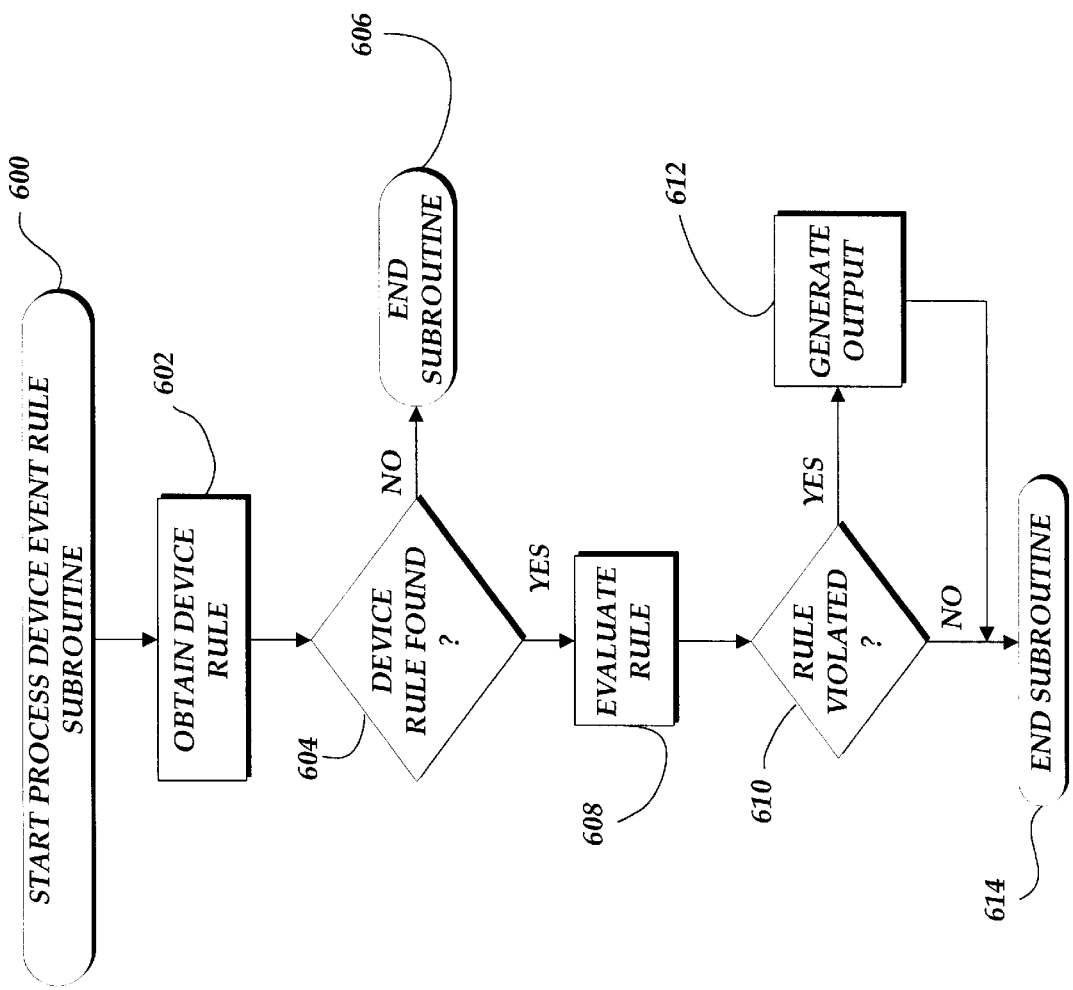
FIG. 6 is a flow diagram illustrative of a device event processing subroutine in accordance with the present invention.

FIG. 6 is a flow diagram illustrative of a process device event subroutine 600 in accordance with the present invention. At block 602, the central server 56 obtains the monitoring device rules. In an actual embodiment, the monitoring device rules are stored in a database 86 in communication with the central server 56. The rules contain data indicating one or more ranges for determining a rule violation. In a broad sense, a rule violation indicates that an event has occurred for which a notification is required. The ranges correspond to the type of data produced by the monitoring device. For example, if a monitoring device 34 is capable of only two stages (e.g., on or off), the rule may indicate that existence of one stage, e.g. "on", is a violation. The rules may also include an indication that one or more monitoring device rules must also be considered before the rule is determined to be violated. For example, a rule corresponding to a glass break detector may indicate that a motion detector signal must be detected before the rule is violated. As will be readily understood by one skilled in the relevant art, additional or alternative rule types are considered to be within the scope of the present invention.

At decision block 604 a test is performed to determine whether a device rule is found. If no rule is found, the process terminates at block 606. If, however, a device rule is found, at block 608 the central server 56 evaluates the rule according to the data received from the monitoring device 34. In an illustrative embodiment, the rules may include preset or default rules maintained by the central server 56. Additionally, the rules may include independently created rules by one or more authorized users. Moreover, one or more authorized users may be given the authority to modify or update rules via a user interface.

At decision block 610, a test is performed to determine whether the device rule is violated. If the rule is violated, at block 612, the central server 56 creates a rule violation output. In an actual embodiment of the present invention, the rules violation output instructions are included in the rule. The instructions include a list of the authorized users to notify in the event of a rule violation and a hierarchy of which communication medium and devices should be utilized to contact each authorized user. For example, the rules may be in the form of logical if/then statements implementing an iterative hierarchy for establishing communication with an authorized user. Moreover, the instructions may also indicate the extent of the data that that authorized user has access to. For example, the output may include the generation of a call to the premises owner's mobile device, the paging of an on-site monitor and a land-line telephone call to the public authorities. Alternatively, the central server may also maintain an output database indicating the output instructions corresponding to each rule.

In addition to generating communications, the rules violation output may also instigate an integrated system response. For example, in the case of an intrusion, a dye may be sprayed on the intruder from an aerosol sprayer. Additionally, the system may sound an audible alarm and directly dial emergency personnel. In an other example, if the system rules violations is a medical emergency, the central server 56 may call an ambulance, turn on lights within the premises, and unlock the doors to facilitate entry by the emergency personnel.

Once the central server 56 has generated the rules violation output at block 612 or if the event rule is not violated at block 610, the subroutine 600 terminates at block 614.

Returning to FIG. 5, if at block 506, the device data includes intelligence information, at block 514, the intelligence is translated from the monitoring device data. At block 516, the log event database 76 is updated to reflect the input data. At block 518, the central server 56 processes the data according to a process asset/resource event subroutine. The routine 500 terminates at block 520.

Figure 7A:
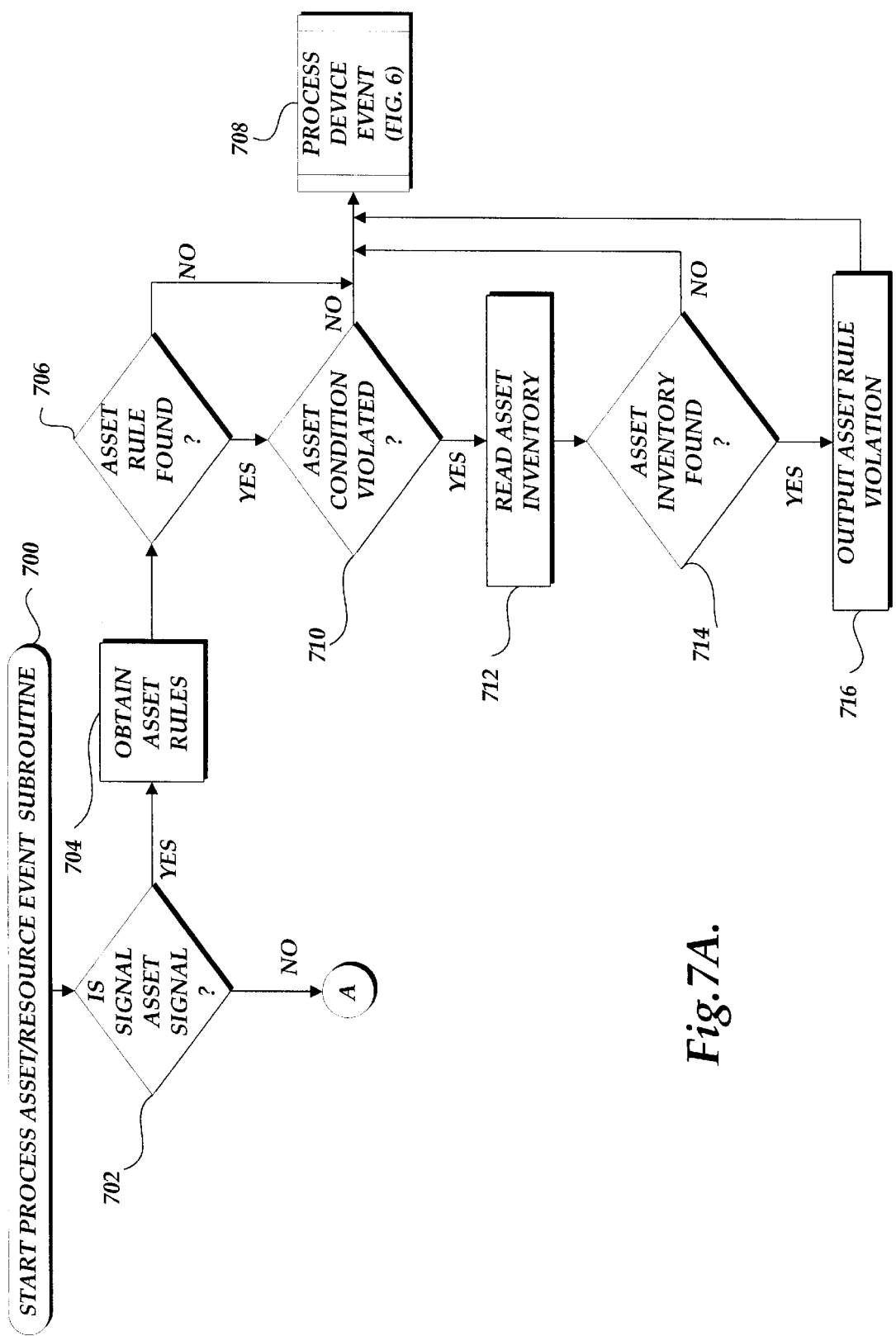
FIGS. 7A and 7B are flow diagrams illustrating an asset/resource event processing subroutine in accordance with the present invention.
Figure 7B:
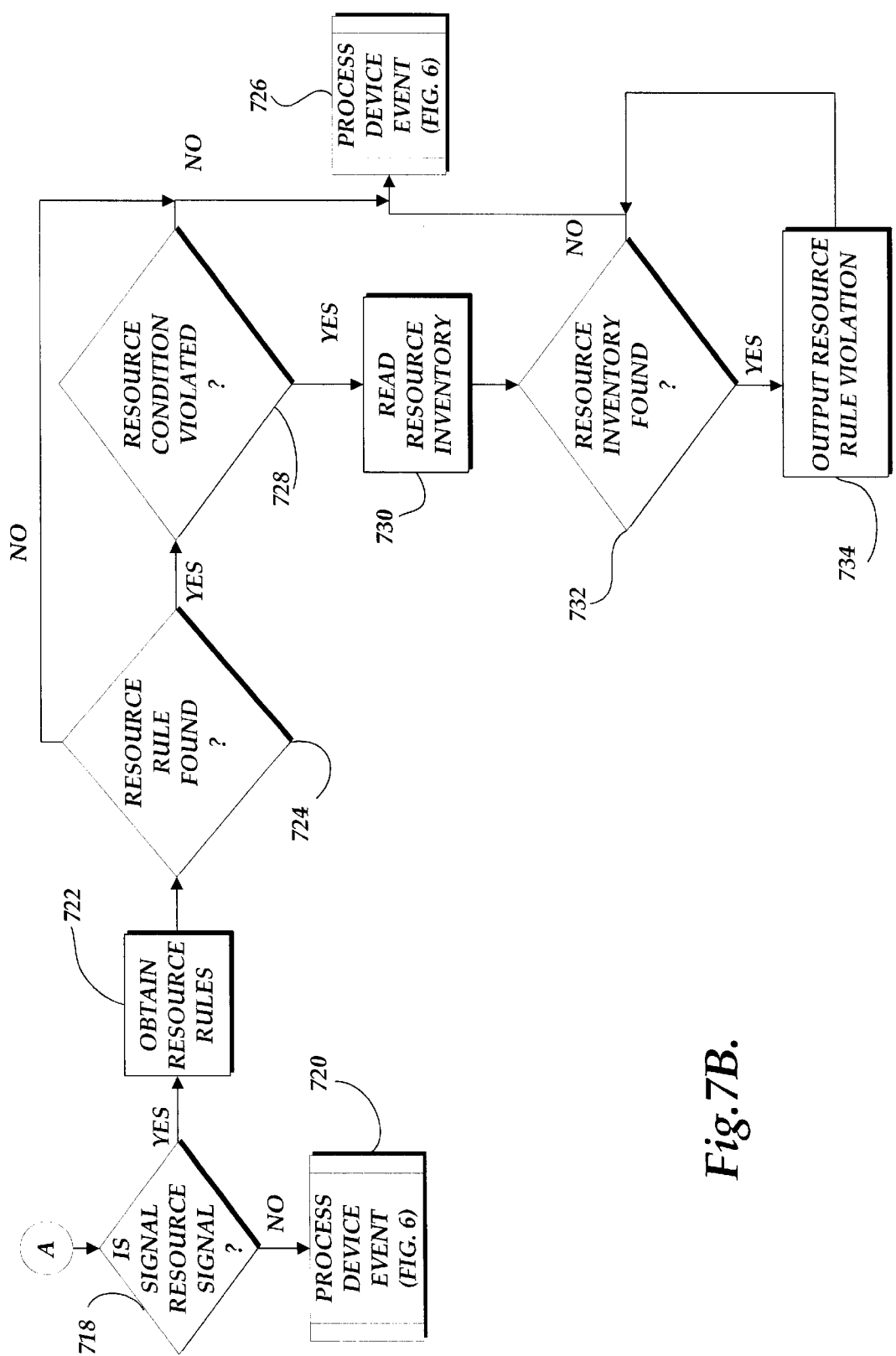

FIGS. 7A and 7B are flow diagrams illustrative of a process asset or resource event subroutine 700 in accordance with the present invention. With reference to FIG. 7A, at decision block 702, a test is performed to determine whether the input signal is asset data. If the signal is identified as asset data, at block 704, the asset rules are obtained. In an actual embodiment of the present invention, the asset rules are maintained and retrieved from an asset rules database 78. At block 706, a test is performed to determine whether an asset rule is found. If no asset rule is found for the asset, the monitoring device data is processed as a device event at block 708. In an actual application of the present invention, the device event is processed as described above with respect to the device event processing subroutine 600 (FIG. 6). In an illustrative embodiment of the present application, in the event the asset rule processing cannot be completed, the monitoring device is still processed as a device-level event.

If an asset rule is found, at decision block 710, a test is performed to determine whether the asset rule is violated. In an actual embodiment of the present invention, the asset rule contains data allowing the central server 56 to determine a rule violation. For example, an asset rule may contain information indicating a requirement of both a particular object (e.g., a computer) performing an action (e.g., logged into a network) for a violation. Additionally, the asset rule may indicate that additional device, resource or asset rules may be considered prior to determining whether the rule has been violated. As explained above, the rules may include preset rules maintained by the central server and user implemented/modified rules.

If the rule has not been violated, the monitoring device data is processed as a device event at block 708. It will be generally understood by one skilled in the relevant art, that processing the rule as a both an asset and a device event allows for multiple purpose processing of the monitoring device data, such as the detection of a specific object and the detection of an object.

If the asset rule has been violated, at block 712, the central server 56 reads a known asset inventory to identify the asset. In an actual embodiment of the present invention, central server maintains and reads from an asset inventory database 82. At decision block 714, a test is performed to determine whether the asset is found in the asset inventory. If the asset is not found, the system defaults to processing the monitoring device data as a device event at block 708. If the asset is found in the asset inventory, at block 716, central server 56 outputs the asset violation. In an actual embodiment of the present invention, the asset rule contains instructions for generating output in the event of a rule violation to one or more authorized users. The instructions also contain a hierarchy of communication mediums and communication devices to attempt to contact the authorized user. Additionally, the instructions may contain alternative contact personnel if central server cannot contact the authorized user. Moreover, as explained above, the output may also instigate action by the integrated system. At block 708, the monitoring device data is processed as a device event.

With reference to FIG. 7B, if the signal is not determined to be asset data at block 702 (FIG. 7A), at decision block 718, a test is done to determine whether the inputted signal is resource data. If the signal is not identified as resource data, at block 720, the monitoring device data is processed as a device event. In an actual application of the present invention, the device event is processed as described above with respect to the device event processing subroutine 600 (FIG. 6). If the signal is identified as resource data, at block 722, the resource rules are obtained. In an actual embodiment of the present invention, the resource rules are maintained and retrieved from a resource rules database 80. At block 724, a test is performed to determine whether a resource rule is found. If no resource rule is found for the resource, the monitoring device data is processed as a device event at block 726.

If a resource rule is found, at decision block 728, a test is performed to determine whether the resource rule is violated. In an actual embodiment of the present invention, the resource rule contains data allowing the central server to determine a rule violation. Additionally, the resource rule may indicate that additional device, resource or asset rules may be considered prior to determining whether the rule has been violated. If the rule has not been violated, at block 726, the monitoring device data is processed as a device event. It will be generally understood by one skilled in the relevant art, that processing the rule as a both a resource and a device event allows for multiple purpose processing of the monitoring device data.

If the resource rule has been violated, at block 730, the central server 56 reads a known resource inventory to identify the resource. In an actual embodiment of the present invention, central server 56 maintains and reads from a resource inventory database 84. At decision block 732, a test is performed to determine whether the resource is found in the resource inventory. If the resource is not found, the system defaults to processing the monitoring device data as a device event at block 726. If the resource is found in the resource inventory, at block 734, central server 56 outputs the resource violation. In an actual embodiment of the present invention, the resource rule contains instructions for generating output in the event of a rule violation to one or more authorized users. The instructions also contain a hierarchy of communication mediums and communication devices to attempt to contact the authorized user. Additionally, the instructions may contain alternative contact personnel if central server 56 cannot contact the authorized user. Moreover, as explained above, the output may also instigate action by the integrated system. At block 726, the monitoring device data is processed as a device event.

In an actual embodiment of the present invention, the integrated information portal 30 is utilized to provide security monitoring services. Specifically, the present invention may be implemented in manner that facilitates selective monitoring specified by one or more users of the integrated information portal 30. One skilled in the relevant art will appreciate that in an integrated information portal services a variety of users, each may have a different set of monitoring needs. By utilizing user-specified rules, the integrated information portal 30 can provide customized monitoring services to each user subscribing to the system.

In an illustrative embodiment of the present invention, a user configures a monitoring rule to detect a threshold amount of movement in a monitored area, such as a room or a parking lot. The detection of movement may be made with any one of a variety of motion detectors and/or with video motion detectors. The threshold level of movement selected by the user is commensurate with the type of monitoring desired and an overall budget for monitoring services. For example, in areas of higher security and/or safety risk, the user may specify in the device, asset or resource rules that upon any detection of motion, the integrated information portal 30 should output video to a human monitor.

In another embodiment of the present invention, the user may specify in the device, asset or resource rules that live video monitoring is to be providing upon obtaining an indication from a person. In this embodiment, the integrated information portal 30 instantiates live monitoring upon receiving and processing audio indications, such as "monitor me", from various audio monitoring devices.

Additionally, the integrated information portal 30 may have voice recognition processing rules set to identify and monitor specific individuals. In this embodiment, the one or more video cameras may be trained by the user to track a specific individual to an assigned parking space in a parking lot. Accordingly, the integrated information portal 30 identifies the individual with biometric monitoring devices and follows a preset monitoring routine. Additionally, the biometric monitoring devices may also be utilized to control ingress/egress of individuals from secure areas. Moreover, as will be described in greater detail below, the biometric sensors assist the integrated information portal 30 with billing services.

In a further embodiment of the present invention, the integrated information portal 30 may have voice stress processing rules for determining and reacting to heightened individual stress situations. In this embodiment, the integrated information portal 30 includes audio monitoring devices that can detect user stress levels, such as height voice patterns, louder audible signals, or stress related words, to detect an emergency. Accordingly, the integrated information portal 30 initiates live monitoring and/or recording upon detecting such a stress level.

In another aspect of the present invention, the integrated information portal 30 is utilized in conjunction with the existing security configurations, personnel, and surroundings to supplement security monitoring. For example, a store may maintain a security guard at a main entrance. However, there may be need for additional monitoring at other areas within the store. Accordingly, the device, asset and resource rules may be set forth to more heavily monitor in areas not readily accessible to the security guard. Accordingly, upon detection of a rule violation, integrate information portal 30 contacts the security guard and may transmit the monitoring information for an appropriate response.

In an another illustrative embodiment of the present invention, a user may maintain different rule sets for a variety of areas within a single premises. For example, the user may implement a set of rules to be utilized during normal business hours (e.g., 9:00 am to 5:00 p.m.) and a second set of rules to be utilized during the remaining period of time.

In a further aspect of the present invention, a provider of the integrated information portal 30 may implement user billing commensurate with an actual amount of time the user utilizes the monitoring service. For example, the integrated information portal 30 utilizes various biometric sensors to identify individual users, or a class of users and keep a record of the amount of monitoring a particular individual utilizes over a given period of time, such as per month. Accordingly, the integrated information portal 30 would generate a service fee commensurate with the time utilized by the individual. Alternatively, a organization may be charged for use by all identifiable members of the organization. Additionally, in an illustrative embodiment of the present invention, the integrated information portal 30 provider may charge varying rates dependent on the specific monitoring devices utilized. For example, a specific cost scale may be used for video monitoring, while a different cost scale may be used for video recording.

The present invention facilitates the integration of a variety of monitoring devices such that monitored data may be processed by a system applying multiple rules. By evaluating the monitored data by one or more rules having different outputs, the same monitoring data may be utilized by different authorized users, having different access rights, for different purposes. This also allows the system to be customized for different privacy regulations.

While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. In an integrated information portal in communication with a number of monitoring devices, wherein the integrated information portal includes a first set of monitoring rules for establishing an event threshold for a rule violation and a corresponding response, a method for managing monitoring device data, the method comprising:
   obtaining a second set of monitoring rules for establishing an event threshold for a rule violation and a corresponding response, wherein the second set of monitoring rules corresponding user defined monitoring rules provided concurrently with the processing of monitoring device data;
   obtaining monitoring device data from one or more of the monitoring devices;
   dynamically processing the monitoring device data according to the declarative user defined monitoring rules; and
   generating an output corresponding to the dynamic processing of the declarative user defined monitoring rules, when the output may include no output.

2. The method as recited in claim 1, wherein processing the monitoring device data according to the declarative user defined monitoring rules includes determining whether the monitoring device data exceeds the event threshold.

3. The method as recited in claim 2, wherein the monitoring device data is video data and wherein the declarative user-defined rules include a threshold amount of detected movement to violate the rule.

4. The method as recited in claim 2, wherein the monitoring device data is audio data and wherein the declarative user-defined rules include a threshold amount of detected audible noise to violate the rule.

5. The method as recited in claim 4, wherein processing the monitoring device data includes identifying a specific individual by utilizing voice recognition means.

6. The method as recited in claim 4, wherein processing the monitoring device data includes determining a user stress level by utilizing stress level monitoring means.

7. The method as recited in claim 2, wherein the declarative user defined rules include at least two rules defining specific time periods of applicability and wherein processing the monitoring device data according to the declarative user defined rules includes determining a rule to apply based on a current time of day.

8. The method as recited in claim 1, wherein the user defined event threshold is the detection of movement and wherein generating an output corresponding to the declarative user defined rules includes storing and saving video monitoring data upon detection of movement.

9. The method as recited in claim 1, wherein the user defined rule event threshold is the detection of a request for live monitoring and wherein generating an output corresponding to the declarative user defined rules includes displaying transmitting live video data to a security monitor.

10. The method as recited in claim 1, wherein the user defined rule event is the detection of a user stress level and wherein generating an output corresponding to the declarative user defined rules includes contacting emergency personnel.

11. The method as recited in claim 10, wherein generating an output corresponding to the declarative user defined rules further includes sounding an audible alarm.

12. The method as recited in claim 1, wherein the declarative user defined rule event is obtaining a request for access to a secured area and wherein generating an output corresponding to the declarative user defined rules includes granting access to the secured area if an identity of a requester can be verified.

13. The method as recited in claim 1, wherein generating an output corresponding to the declarative user defined rules further includes obtaining additional monitoring device data.

14. The method as recited in claim 1 further comprising:

tracking an amount of time in which the monitoring device data is processed according to the declarative user-defined rules; and generating a bill corresponding to the amount of time tracked.

15. The method as recited in claim 14, wherein generating a bill corresponding to the amount of time tracked includes generating a bill corresponding to particular devices utilized.

16. A computer-readable medium having computer-executable instructions for performing the method recited in any one of claims 1–15.

17. A computer system having a processor, a memory, and an operating environment, the computer system operable for performing the method recited in any one of claims 1–15.

18. The method as recited in claim 1, wherein the set of declarative user-defined rules includes a description of asset data and resource data.

19. The method as recited in claim 18, wherein the set of declarative user-defined rules includes a description of device data.

20. A system for monitoring information, the system comprising:

a number of monitoring devices operable to capture and transmit monitoring device data;

a central processing server operable to obtain monitoring device data and process, the data; and a rules database in communication with the central processing server, wherein the rules database includes a first and second set of monitoring rules for establishing an event threshold for a rule violation and a corresponding response and a second set of monitoring rules, wherein the second set of monitoring rules correspond to user defined monitored rules obtained concurrently with the processing of monitoring device data;

wherein central processing server dynamically processes the monitoring device data with the second set of monitoring rules and generates customized outputs, which can include no output.

21. The system as recited in claim 20, wherein the monitoring device data includes video monitoring device data and wherein at least one declarative rule in the rules database includes a definition of a threshold of detectable movement.

22. The system as recited in claim 20, wherein the monitoring device data includes audio monitoring device data and wherein at least one declarative rule in the rules database includes a definition of a threshold of detectable sound.

23. The system as recited in claim 22, wherein the threshold of detectable sound is established to determine a stress level.

24. The system as recited in claim 18 further comprising voice recognition means, wherein the monitoring devices include audio monitoring devices and wherein at least declarative one rule in the rules database includes a definition of voice patterns for identification.

25. The system as recited in claim 20, wherein the central processor is configured to track an amount of time utilized to process the monitoring device data according to the declarative user-defined rules.

26. The method as recited in claim 20, wherein the set of declarative user-defined rules includes a description of asset data and resource data.

27. The method as recited in claim 26, wherein the set of declarative user-defined rules includes a description of device data.

28. In an integrated information portal in communication with a number of monitoring devices, wherein the integrated information portal includes a first set of security monitoring rules for determining a security event and generating an output corresponding to the determined security event, a method for providing security monitoring, the method comprising:

obtaining a user defined request for monitoring of a remote site, wherein the request for monitoring a remote site includes a second set of monitoring rules for determining a security event and generating an output corresponding to the determined security event, wherein the user defined request is received concurrently with the processing of the monitoring device data;

obtaining monitoring device data corresponding to the request for monitoring; and dynamically processing the monitoring device data according to the second set of monitoring rules.

29. The method as recited in claim 28 further comprising:

accessing local monitoring request rules;

processing the monitoring request information according to the monitoring request rules; and obtaining the device data only if the request satisfies the local monitoring request rules.

30. The method as recited in claim 29, further comprising generating a response to the user to indicate that monitoring has begun.

31. The method as recited in claim 29, wherein processing the monitoring request information includes utilizing facial recognition means to identify a user.

32. The method as recited in claim 29, wherein processing the monitoring request information includes utilizing voice recognition means to identify a user.

33. The method as recited in claim 28, wherein obtaining the monitoring device data is established by accessing a network connection in the information portal.

34. The method as recited in claim 33, wherein the network connection is an IP network connection.

35. The method as recited in claim 28, wherein the monitoring device data is video data.

36. The method as recited in claim 35, wherein the video data is generated by one or more fixed video cameras.

37. The method as recited in claim 35, wherein the video data is generated by one or more directional video cameras.

38. The method as recited in claim 28, further comprising tracking an amount of time in which the device data is processed according to the declarative user-defined rules and generating a bill corresponding to the amount of time tracked.

39. The method as recited in claim 38, wherein generating a bill corresponding to the amount of time tracked includes generating a bill corresponding to particular devices utilized.

40. A computer-readable medium having computer-executable instructions for performing the method recited in any one of claims 28–39.

41. A computer system having a processor, a memory and an operating environment, the computer system operable for performing the method recited in any one of claims 28–39.

42. The method as recited in claim wherein the set of declarative user-defined rules includes a description of asset data and resource data.

43. The method as recited in claim 42, wherein the set of declarative user-defined rules includes a description of device data.

* * * * *

UNITED STATES PATENT AND TRADEMARK OFFICE
CERTIFICATE OF CORRECTION

PATENT NO. : 6,542,075 B2
DATED : April 1, 2003
INVENTOR(S) : G.T. Barker et al.

It is certified that error appears in the above-identified patent and that said Letters Patent is hereby corrected as shown below:

Title page,
Item [56], References Cited, OTHER PUBLICATIONS, "24, 1999."
should read -- 28, 1999. --
Item [57], ABSTRACT,
Line 10, "administrator" should read -- administrator, --
Line 15, "and devices" should read -- and devices. --
Line 16, delete "and/or the"

Column 14,
Line 36, "corresponding user" should read -- correspond to user --

Column 15,
Line 13, "transmitting" should read -- transmitted --
Line 57, "process, the data" should read -- process the data --

Column 16,
Line 1, "wherein central" should read -- wherein the central --
Line 18, "claim 18" should read -- claim 20, --
Line 21, "declarative one rule" should read -- one declarative rule --
Line 53, "claim 28" should read -- claim 28, --

Column 18,
Line 10, "in claim wherein" should read -- in claim 28, wherein --

Signed and Sealed this

Twenty-second Day of June, 2004

JON W. DUDAS
*Acting Director of the United States Patent and Trademark Office*